United States Patent [19]

Wild et al.

[11] Patent Number: 5,053,691

[45] Date of Patent: Oct. 1, 1991

[54] METHODS AND DEVICE FOR STABILIZING AN ELECTRIC SUPPLY SYSTEM THROUGH THE ADAPTATION OF A CONTROLLER OF A STATIC COMPENSATING DEVICE

[75] Inventors: Georg Wild, Langensendelbach; Karl-Friedrich Leowald, Uttenreuth-Weiher, both of Fed. Rep. of Germany; Vladimir E. Henner, Epping, Australia

[73] Assignee: Siemens Aktiengesellschaft, Berlin & Munich, Fed. Rep. of Germany

[21] Appl. No.: 482,257

[22] Filed: Feb. 20, 1990

[30] Foreign Application Priority Data

Feb. 21, 1989 [DE] Fed. Rep. of Germany ....... 3905261

[51] Int. Cl.⁵ .............................................. G05F 1/70
[52] U.S. Cl. ..................................... 323/211; 323/210
[58] Field of Search ................................ 323/210, 211

[56] References Cited

U.S. PATENT DOCUMENTS

| 4,104,576 | 8/1978 | Frank . | |
|---|---|---|---|
| 4,199,804 | 4/1980 | Juhlin | 363/51 |
| 4,353,024 | 10/1982 | Gyugyi | 323/211 |
| 4,680,531 | 7/1987 | Rey et al. | 323/206 |
| 4,769,587 | 9/1988 | Pettigrew | 323/209 |

FOREIGN PATENT DOCUMENTS

| 0239278 | 9/1987 | European Pat. Off. . |
| 0245651 | 11/1987 | European Pat. Off. . |
| 101823 | 5/1986 | Japan . |
| 0639801 | 11/1983 | Switzerland . |
| 2146466 | 4/1985 | United Kingdom . |
| 2187576 | 9/1987 | United Kingdom . |

Primary Examiner—William H. Beha, Jr.
Attorney, Agent, or Firm—Kenyon & Kenyon

[57] ABSTRACT

When there are variations in the short-circuit power of a system, the operating conditions can change, particularly in a controller of a compensating device. To automatically adapt the controller and to avoid or suppress oscillations or voltage variations in the system, a method is provided according to a first solution, where the circuit state of a compensating element is modified for testing purposes. The reaction of the system is detected in a device and, then a parameter which determines the damping of the controller is modified by means of a computing device. According to a second solution, an oscillation of the controller is established by detecting a signal which is dependent on the system voltage and by comparing specific variations. To suppress the oscillations, the hysteresis of the controller is damped by means of the computing device.

17 Claims, 8 Drawing Sheets

METHODS AND DEVICE FOR STABILIZING AN ELECTRIC SUPPLY SYSTEM THROUGH THE ADAPTATION OF A CONTROLLER OF A STATIC COMPENSATING DEVICE

FIELD OF THE INVENTION

This invention relates to a method and device for the stabilizing of an electric supply system by adapting a controller, in particular a controller of a static compensating device, where the controller causes compensating elements to be switched into a system via a controlling system.

BACKGROUND OF THE INVENTION

In a known design for stabilizing an electric supply system, the controller is adjusted for a defined short-circuit capacity of the system. This system short-circuit capacity can change within broad limits. When this short-circuit capacity changes, the controller works completely inadequately, requiring large nominal-actual deviations to react at all, or it causes controller oscillations. This inevitably leads to system voltage oscillations, which lie within the critical frequency ranges of the system.

There is a need for a method and a device to automatically adapt the controller to the respective operating conditions and to suppress or avoid undesirable controller oscillations and thus voltage variations in the system.

SUMMARY OF THE INVENTION

This and other needs are satisfied by the method and device of the present invention for stabilizing an electric supply system.

By means of a measuring transducer, a signal is formed for a first system voltage value and stored as information in a memory of a computer. The circuit state of at least one compensating element is modified. The compensatory element has a defined value and is switchable to the system. A signal resulting from this is formed for a second system voltage value by means of a detecting element and is stored as information in a further memory of the computer. The difference between the signals for the first and the second system voltage values is calculated in the computer. At least one parameter value of the controller which defines the damping is calculated in the computer and a proportional signal is formed from the signal representing the difference of the first and second system voltage values. The proportional signal is then fed to a final controlling input of the controller.

With this simple method, a value for the present system short-circuit capacity is determined by initiating a deliberate reaction on the system. This information is used to determine the current parameters for the controller. A particularly good automatic control of both the system voltage and the reactive power is possible using this method.

The device for implementing this method can be a static compensating device with a controller connected to a system. A controlling system causes the controller to regulate semiconductor switches which connect the compensating elements to the system. A device coupled to the system for detecting the system voltage is coupled on the output side to one input each of two storage units. The two storage units have trigger inputs which are coupled to a control instrument. At specific times the control instrument transmits triggering pulses to the storage units. The output signals of the storage units are fed into a comparator whose output is coupled to a computing device. The computing device is switched on the output side to a final controlling input of the controller. The final controlling input determines the damping.

In another method of the present invention a signal is formed with a detecting element, which is coupled to a device carrying a signal dependent on the system voltage. This signal is fed to a computer, monitored for any variation, and a differential signal corresponding to the variation is formed. This differential signal is stored as information in a memory. When the differential signal is reset in the computer, a pulse signal is formed and stored as information in a further memory. After the differential signal has been stored and reset and the pulse signal has been stored, which are necessary conditions for an oscillation of the controller, at least one parameter value of the controller is modified. This value determines the damping.

In this manner, by suppressing the controller oscillations using simple means, powerful system voltage fluctuations can be quickly reduced. Thus further disturbances on the system can be avoided.

The device for implementing this method can be a static compensating device with a controller coupled to a system. A controlling system causes the controller to regulate semiconductor switches, which couple the compensating elements to the system. A signal which is dependent on the system voltage is fed to a differentiating element. The output of the differentiating element is coupled to two Schmitt triggers where one Schmitt trigger works in a positive direction and the other works in a negative direction. A series connection comprising a first timing element with OFF delay, an AND gate, a second timing element with OFF delay, and a third timing element with ON delay is coupled to the output of one Schmitt trigger. The output of the other Schmitt trigger is coupled to the second input of the AND gate. The output of the third timing element is fed to a computing device which determines the increase of the parameter of the controller.

In both methods of the present invention the controller parameters are able to be adjusted in a simple manner.

DETAILED DESCRIPTION

Figure 1:
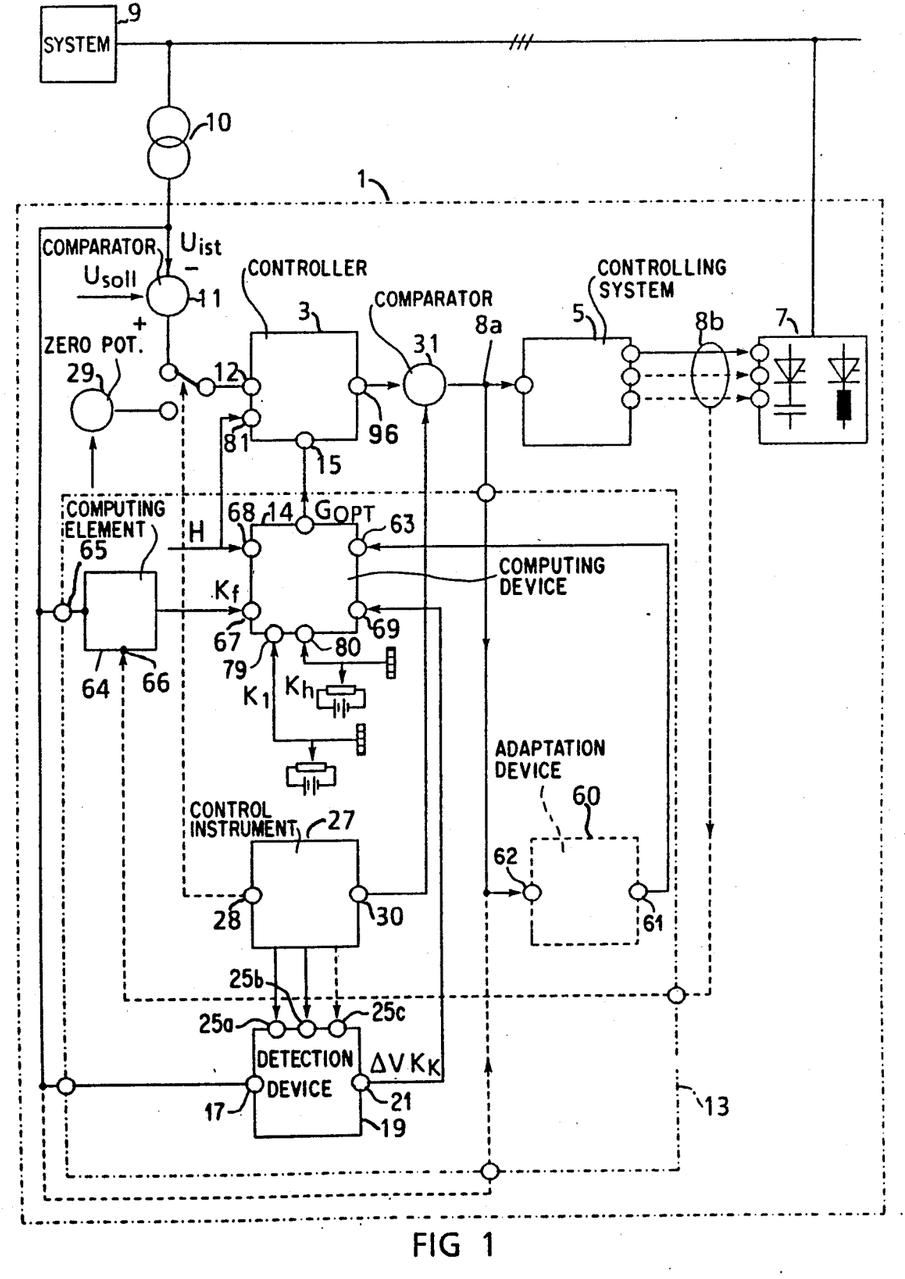
FIG. 1 is a general block diagram of a device for adapting a controller in the voltage regulating operation constructed according to the present invention.

Referring to FIG. 1, a compensating device 1 for stabilizing an electric supply system is shown. A controller 3 acts on compensating elements 7 by way of a controlling system 5. The compensating elements 7 may be coils and/or capacitors which are actuated by thyristors and are coupled to line poles of a system 9. The system 9 can be designed as a single-phase or multiphase system. A setpoint deviation, in particular a setpoint deviation of the system voltage, is fed as a controlled variable to the controller 3. For this purpose, a measuring transducer 10 is coupled via a setpoint comparator 11 to an input 12 of the controller 3. A computer 13 is coupled to a final controlling input 15 of the controller 3. The computer 13 is used to calculate at least one parameter value of the controller 3 defining the gain or hysteresis. This parameter value influences the damping as well as the dynamic behavior of the controller 3. The calculation of the parameter value defining the damping is based on the following equation:

$$G_{OPT} = k_1 \frac{1}{\Delta V \cdot k_k \cdot k_h \cdot k_f + H}$$

In this respect:

$G_{OPT}$ = the optimum gain of the system deviation U;
$k_1$ = constants, dependent on the possible gain of the actual-value signal;
$\Delta V$ = a detected voltage deviation in the system, which occurs when a compensating element is actuated, or which results when changing by a definitely specified MVAr-value;
$k_k$ = correction constants, which are retrieved as a function of the respective switched stage by way of a programmable memory;
$k_h$ = constants, with which a hysteresis of the controller can be specified;
$k_f$ = a correction factor, which is a function of the respective system frequency;
H = drooping characteristic of the controller with which the slope of the characteristic curve of the controller can be specified.

Hysteresis is approximately equal to the reciprocal of $G_{opt}$. To calculate the respective optimum gain, a computing device 14, a device 19 for detecting a system voltage deviation, a control instrument 27, a device 60 and a computing element 64 are arranged in the computer 13.

The secondary circuit of the measuring transducer 10 is also further switched to an input 17 of a device 19. This device 19, which is used to detect a system voltage deviation, is coupled through its output 21 to a first input 69 of the computing device 14. The device 19 is shown in greater detail in FIGS. 2 and 3. A control instrument 27 acts on the trigger inputs 25a, 25b, 25c of the device 19. The control instrument 27 has a first output 28 to switch over the controlled variable of the controller 3 from the setpoint (actual value) comparator 11 to a zero potential 29. The second output 30 leads to a comparator 31. This comparator 31 is coupled between the controller 3 and the controlling system 5.

A computing element 64 is provided to determine the correction factor $K_f$. The actual value of the system voltage is fed to input 65 of computing element 64. The actual frequency value is calculated from the system voltage in the computing element 64. The output signal of the controlling system 5 is an additional signal which depends indirectly on the system voltage. The controlling system 5 is coupled between the controller 3 and the semiconductor switches of the compensating element 7. The output signal of controlling system 5 is fed to the input 66 of the computing element 64. It can be determined from this signal whether the compensating element 7 is working in the capacitive or inductive range. Depending on this, the factor $k_f$ is determined as a function of a characteristic of a component arranged in the computing element 64 and is fed via an input 67 to the computing device 14. The signal H (drooping characteristic of the controller) appears at an additional input 68. Signals which correspond to the constants $k_1$ or $k_h$ appear at inputs 79, 80.

The above-named value, $\Delta V$, in the voltage regulating operation can be determined using the following method. A logic circuit is provided in the control instrument 27. When no unusual operating conditions exist in the system 9 and in the equipment, this logic circuit causes a signal formed by the measuring transducer 10 for a first system voltage value in the device 19 to be stored as information in a memory of the device 19 via one of the trigger inputs 25a, 25b, 25c at time t1. At a time between t1 and t2, the input 12 of the controller 3 is switched for a short time by the control instrument 27 to a zero potential 29. When this occurs, the control loop is open-circuited, and the result is that the controller 3 cannot correct any system deviation that may exist. At the same time, a value is fed to the comparator 31 via the output 30 of the control instrument 27. This value causes the controlling system 5 to change the circuit state of at least one compensating element 7. A compensating element 7 with a specified value is switched to the system 9 from controlling system 5. Thus the system 9 undergoes a modification of its voltage value. At time t2, the control instrument 27 again acts on one of the trigger inputs 25a, 25b, 25c, so that a second signal formed by the measuring transducer 10 is stored in a further memory. The second signal formed by the measuring transducer 10 is for a system voltage value resulting from the switching action mentioned above. Next, the difference between the two system voltage values is formed in the device 19. This difference is fed via the output 21 to the computing device 14. A parameter value of the controller 3 determining the gain or hysteresis is calculated in the computing device 14 and fed to the final controlling input 15 of the controller 3.

Due to the intentional connection of a compensating element 7 to the system 9 and the resulting voltage change on the system 9, the most favorable setting for the controller 3 is determined to enable it to work in an optimum range.

Preferably, these steps can also be repeated cyclically, so that a cyclical adaptation of the controller 3 occurs and changes in the system condition that have occurred in the interim are considered in the parameters of the controller 3.

The controller 3 brings about the switching actions of the compensating elements 7 in the normal voltage regulating operation. The resulting system voltage variations can likewise be used for adapting the controller 3 in accordance with the method described above. For this purpose, the system voltage must be monitored before and after the change in the circuit state.

After the second voltage value is stored at time t2, it is advantageous for the circuit state of the compensating element 7 to be restored to the original circuit state and for a third resulting system voltage value to be detected by the device 19 at time t3. In this method, the intended variation of the system condition is canceled again. The third system voltage value is compared to the second system voltage value. From this difference, as well as from the difference of the first two system voltage values, a differential value is formed which is subjected to a plausibility control. This plausibility control shall be explained in more detail in the description of FIG. 3. This plausibility control and a subsequent averaging of the two differential values takes place in a computing device. The average value is then fed to the computing device 14.

Figure 2:
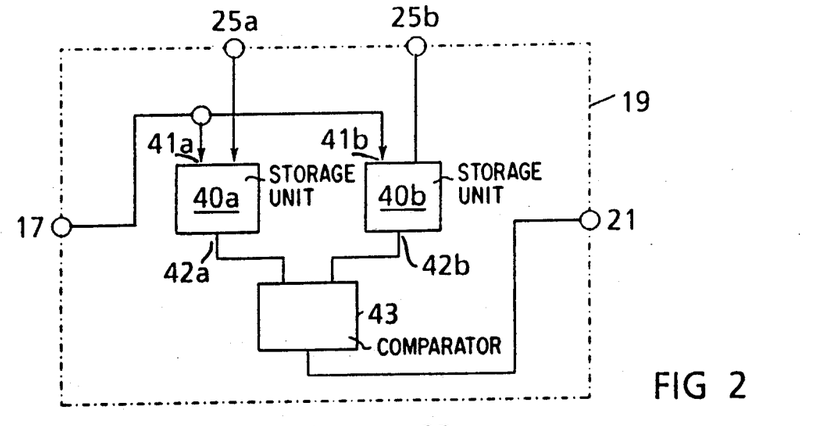
FIG. 2 is a block diagram of a device for detecting a system voltage deviation constructed according to the present invention.

Referring to FIG. 2 a detailed block diagram of the device 19 is shown. The trigger inputs 25a, 25b are coupled respectively to storage units 40a, 40b, whose voltage inputs are supplied through input 17. The outputs 42a, 42b are switched to a comparator 43, which is coupled to the output 21. The input 17 is coupled to the system 9 through a detecting element which is designed as a measuring transducer 10 in this embodiment (FIG. 1). At time t1, the storage unit 40a receives a triggering pulse via the trigger input 25a, so that the signal being applied to the voltage input 41a and formed by the measuring transducer 10 is stored as a first system voltage value. After a compensating element 7 is actuated, the signal which is formed by the measuring transducer 10 and applied to the voltage input 41b is stored at time t2 in the storage unit 40b as a second system voltage value. The differential value of both the measured and stored system voltage values is then accumulated in the comparator 43. The differential value is fed to the output 21 for further transmission to the computing device 14. A parameter value for the controller 3 which determines the damping is calculated in this computing device 14 and a proportional signal is formed. This signal is then fed to the controller 3. The device 19 has a very simple design and requires only a few components.

Figure 3:
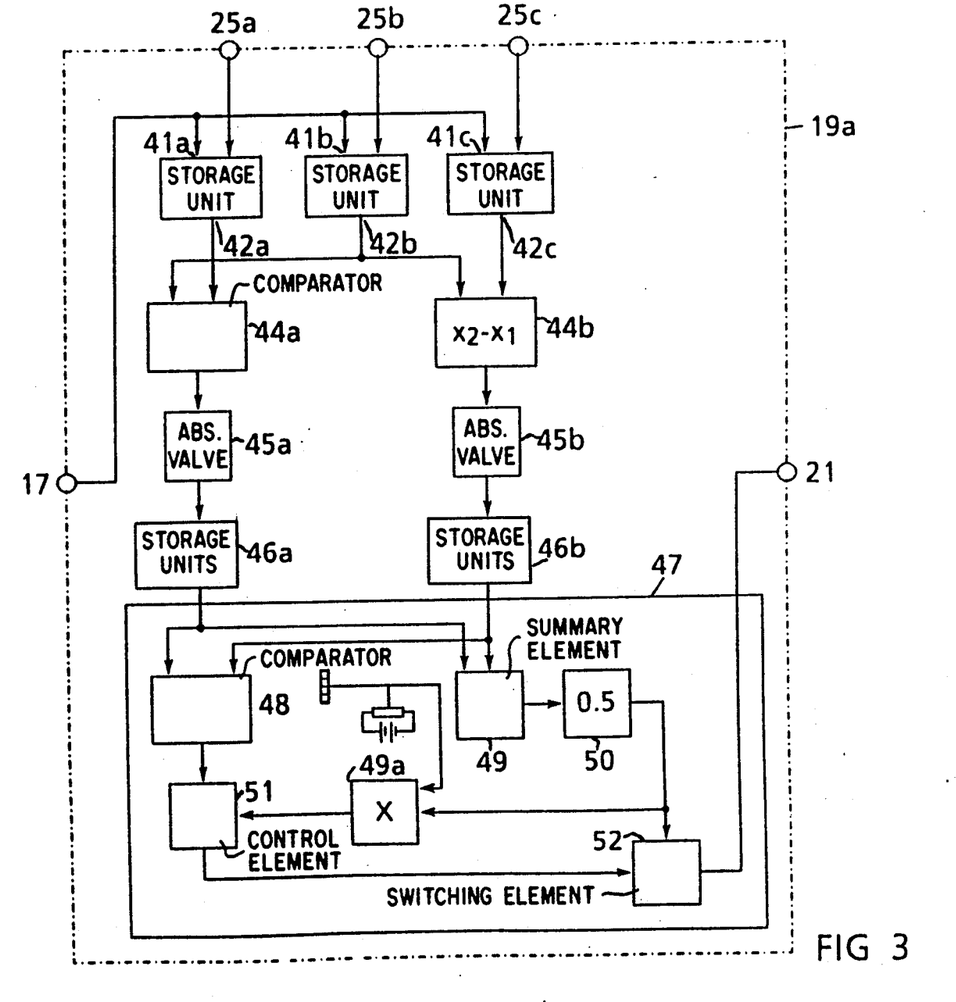
FIG. 3 is a detailed diagram of the device of FIG. 2.

Referring to FIG. 3 a further refinement of the device 19 is shown as the device 19a. The device 19a has three trigger inputs 25a, 25b, 25c, each coupled to one of the storage units 40a, 40b or 40c. The voltage inputs 41a, 41b and 41c are coupled to the input 17, which is coupled through a measuring transducer 10 to the system 9. The outputs 42a, 42b of the storage units 40a, 40b lead to a first comparator 44a. The outputs 42b, 42c of the storage unit 40b, 40c lead to a second comparator 44b. The outputs of both comparators 44a, 44b lead via the absolute value elements 45a and 45b to the storage units 46a and 46b to accumulate the amount. The output signals of the storage units 46a, 46b are fed to a computing device 47. In this computing device 47, the output signals of the storage units 46a and 46b are fed to a comparator 48 and a summing element 49. After the output signals are added up, the sum is multiplied in a downstream amplifier 50 by 0.5 to form an average value. The output value of the comparator 48 is subjected to a plausibility control in an element 51. The output value of the comparator 48 is compared to a value which is specified by a multiplier 49a in the element 51. A first input of this multiplier 49a is coupled to the output of the amplifier 50. The second input of this multiplier 49a is coupled to a signal which specifies the gain. If the absolute value of the output signal of the comparator 48 is smaller than that of the output signal of the multiplier 49a, then the measurement is plausible. When there is a positive result, element 52 switches the average value through to the output 21.

An improved measuring accuracy is attained by obtaining system voltage measurements before the compensating element 7 is switched in, after it is switched in, and after it is switched away. Also, error measurements resulting from disturbances are ruled out to the greatest possible extent. Because there is only short-term variation in the circuit state of the compensating element 7, the system 9 also remains undisturbed to the greatest possible extent.

Figure 4:
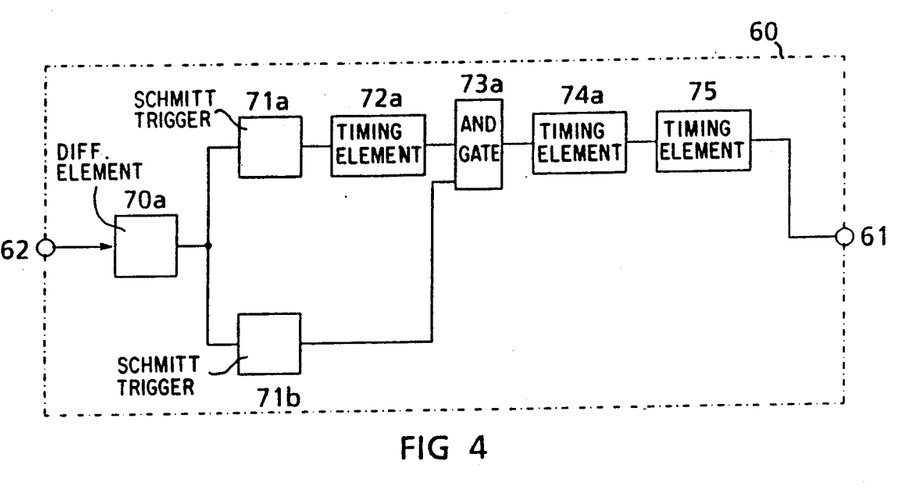
FIG. 4 is a block diagram of a device for detecting controller oscillations constructed according to the present invention.

Referring to FIG. 4, a detailed block diagram of the device 60 for adapting the controller 3 is shown. This device 60 can be used in addition to the device 19. This manner in which the device 60 is interconnected to the compensating device 1 is shown in FIG. 1. The device 60 has an output 61, which is coupled to the second input 63 of the computing device 14. From the signal appearing at this second input 63, the computing device 14 calculates a change in a parameter of the controller 3 determining the hysteresis or the damping. The parameter is transferred as described already above. A signal, which is dependent on the system voltage, is fed to the device 60 via an input 62. This signal can be a voltage which is proportional to the system voltage and is supplied to the input 62 via the measuring transducer 10. Also, the output information of the controlling system 5 can be supplied to the input 62 via a detecting element 8b.

In a refinement of the present invention, the output signal of the controller 3 is fed as a signal, which is dependent on the system voltage, to the input 62 via detecting element 8a. In accordance with the invention, the following process steps are carried out in the device 60.

The signal, which is dependent on the system voltage, is formed by a detecting element 8a, applied to the input 62, and monitored for any variation. When detecting element 8a detects a variation of the signal, a signal corresponding to the variation is then stored as information in the timing element which is used as a memory. Detecting element 8a also detects when the variation is reset. If the signal has been changed and reset, then there has been an oscillation of the controller 3. To suppress this oscillation, a parameter value of the controller 3 is modified via the output 61 and the computing device 14 thereby preventing oscillations of the controller 3. The variation and the resetting of the signal must take place within a specified time period. The damping of the controller 3 is advantageously increased.

Referring to FIG. 4, a block diagram of the device 60 is shown. The output signal of the controller 3 is fed via the input 62 to a differentiating element 70a, whose output is coupled to two Schmitt triggers 71a and 71b. The first Schmitt trigger 71a reacts to a positive signal and the second Schmitt trigger 71b reacts to a negative signal. A series connection comprising a first timing element 72 with OFF delay, an AND gate 73a, a second timing element 74a with OFF delay, and a third timing element 75 with ON delay is coupled to the output of the first Schmitt trigger 71a. The output of the second Schmitt trigger 71b is coupled to the second input of the AND gate 73a. The output signal of the third timing element 75 is fed to the output 61.

When a variation in voltage is received by the differentiating element 70a, it transmits a signal to the Schmitt triggers 71a and 71b. When a positive signal appears at the output of the differentiating element 70a, the first Schmitt trigger 71a transmits a pulse to the first timing element 72a which causes a signal to be applied to the first input of the AND gate 73a for a time t1. If within this time t1, a signal reaches the second input of the AND gate 73a via the Schmitt trigger 71b, which requires a negative signal to be tripped, the AND gate 73a in turn transmits a signal to the second timing element 74a. When the signal is transmitted to the second timing element 74a, a second time t2 is started. The time constant of the second timing element 74a is smaller than that of the third timing element 75. When the second timing element 74a emits an output signal for a time which is longer than the time constant t3 of the third timing element 75, the third timing element 75 emits an output signal. The significance of this is that when adequate voltage variations occur at the input 62 within a time span specified by the third timing element 75, a signal is emitted at the output 61. With this method, an oscillation of the controller 3 is reliably recognized. After this recognition, as described above, the controller 3 is then influenced by means of the computing device 14, for example reducing the controller's gain, so that the oscillation is suppressed.

Figure 5:
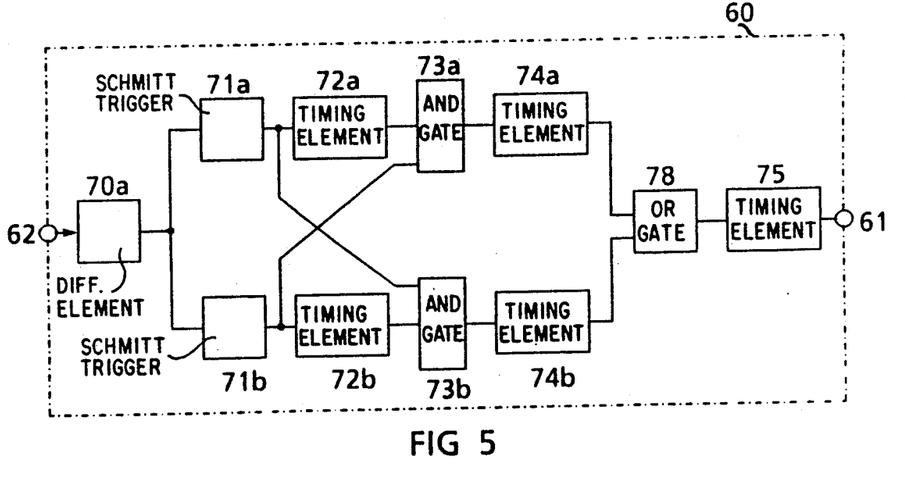
FIG. 5 is a first variation of the device of FIG. 4 for detecting controller oscillations.
Figure 6:
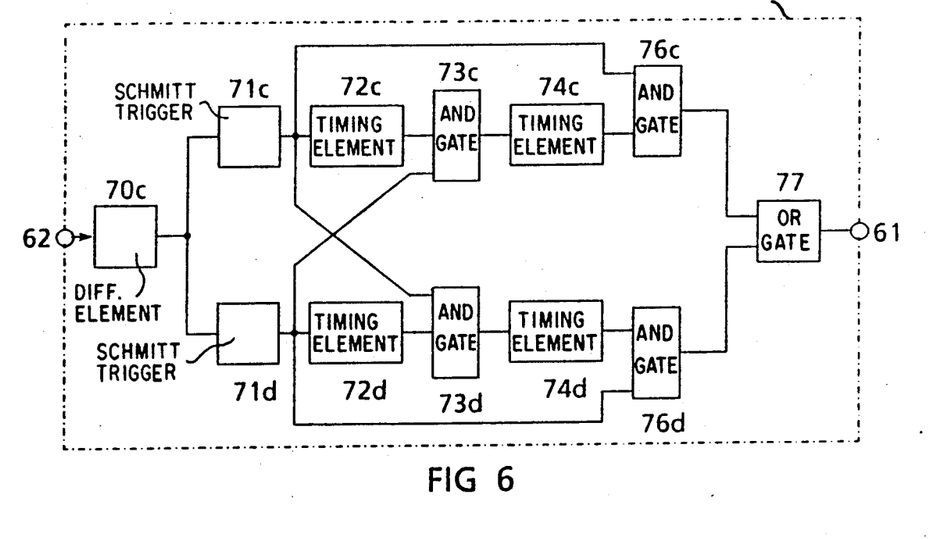
FIG. 6 is a second variation of the device of FIG. 4 for detecting controller oscillations.

Referring to FIG. 5, a first refinement of the device 60 of FIG. 4 is shown. This version offers the advantage of being designed symmetrically for negative as well as for positive voltage changes. This means that it is unimportant whether the change in the signal, which is dependent on the system voltage, begins with a positive or a negative oscillation. The device 60 is constructed analogously to the device 60 in FIG. 4, where the second Schmitt trigger 71b is also coupled on the load side to a series connection comprising a first timing element 72b, an AND gate 73b, and a second timing element 74b. The second input of the AND gate 73b is coupled to the output of the first Schmitt trigger 71a. An OR gate 78 is coupled between the timing elements 74a and 75. The output of the second timing element 74a is coupled to the other input of the OR gate 78. This circuit design makes it possible to detect signal variations in both positive and negative directions. The mode of operation is analogous to the circuit arrangement shown in FIG. 4. Referring to FIG. 6, a second refinement of the device 60 is shown. A signal which is dependent on the system voltage, in this case the output signal of the controller 3, is carried via the input 62 to a differentiating element 70c. The output of this differentiating element 70c is coupled to two Schmitt triggers 71c, 71d. A first Schmitt trigger 71c processes signal edges in a positive direction and the second Schmitt trigger 71d processes signal edges in a negative direction. A series connection comprising a first timing element 72c or 72d with OFF delay, a first AND gate 73c or 73d, a second timing element 74c or 74d with OFF delay, and a second AND gate 76c or 76d is coupled to the outputs of the two Schmitt triggers 71c and 71d. The outputs of the Schmitt triggers 71c and 71d are also respectively coupled to the second input of the second AND gate 76c or 76d. The outputs of each Schmitt triggers 71c and 71d are also respectively coupled to the second input of the first AND gate 73d or 73c of the other Schmitt trigger 71c or 71d. The output signals of the two second AND gates 76c and 76d are fed to the OR gate 77, whose output 61 is coupled to the computing device 14. The computing device 14 determines at least one parameter of the controller 3.

An oscillation of the controller 3 is detected in the device 60 according to the following method. The differentiating element 70c detects a voltage change at the input 62 and passes it on to the Schmitt triggers 71c and 71d. If the voltage change is positive, the first Schmitt trigger 71c sets the first timing element 72c, whose now active output signal is applied to the first input of the first AND gate 73c. If within the time t1 of the first timing element 72c, a signal reaches the other input of the AND gate 73c via the Schmitt trigger 71d, then a second timing element 74c is started. The output signal of the second timing element is applied for a time t2 to the second AND gate 76c. If within this second time t2 a further signal reaches the other input of the second AND gate 76c via the first Schmitt trigger 71c, then information is transmitted to the computing device 14 via the OR gate 77 and the output 61. The information transmitted to the computing device 14 in turn determines a parameter value of the controller 3. In this case, a criterion for an oscillation of the controller occurs when a signal, which is dependent on the system voltage, has carried out three changes of direction within a specified time span. This circuit is designed symmetrically for positive as well as for negative voltage changes.

A concatenation of the individual modules is also possible, making longer timing supervision attainable for more than three changes of direction. A refinement using counting modules is likewise conceivable.

With this method of the present invention and the appropriate device, it is possible to reliably recognize controller oscillations. After a controller oscillation has been recognized, parameters in the controller 3 are immediately modified in such a way that the oscillation is suppressed. This is particularly important for reducing the system fault level.

If an oscillation of the controller 3 is suppressed, then the controller 3 can be automatically adapted, as initiated by control instrument 27, to a new system situation. In doing so, the current system voltage deviation produced by an altered compensating element 7 is then formed in a device 19 or 19a again and supplied to the computing device 14. The device 60 can also be used with the appropriate method for oscillation recognition without a device 19.

Figure 8:
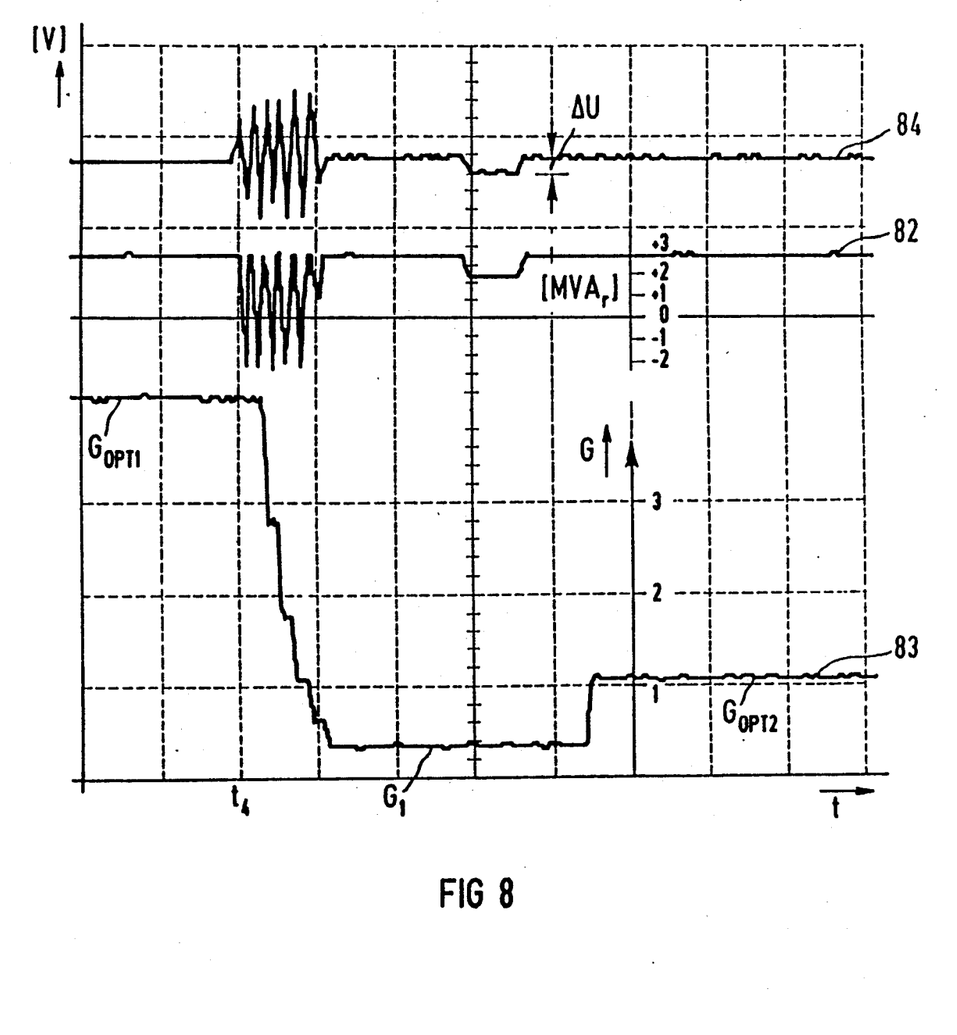
FIG. 8 shows the waveforms of the automatic gain adaptation of the controller after a sudden reduction of the system fault level from 10 GVA to 1 GVA.

Referring to FIG. 8, waveforms are shown for an automatic gain adaptation of the controller after a sudden reduction of the system fault level from 10 GVA to 1 GVA. The time is plotted on the abscissa, where one division corresponds to 400 ms. Three waveforms are plotted on the ordinate. The first signal pattern 84 represents the actual value of the system voltage. One division on the ordinate corresponds to 25% of the system voltage.

From the second signal pattern 82, the present circuit state with the stages −2 to +3 of the compensating element 7 is shown.

The third signal 83 represents the amplification of the output signal of the computing device 14 in standardized form. Before switching over the short-circuit power from 10 GVA to 1 GVA, the amplification has the value $G_{OPT1}$, which is deliberately reduced after the time t4 to $G_1$, until no more oscillation is detected. After that, a v '˖ge measurement is deliberately initiated, to determine a new level $G_{OPT2}$. This new level $G_{OPT2}$ corresponds to the new system fault level.

Figure 7:
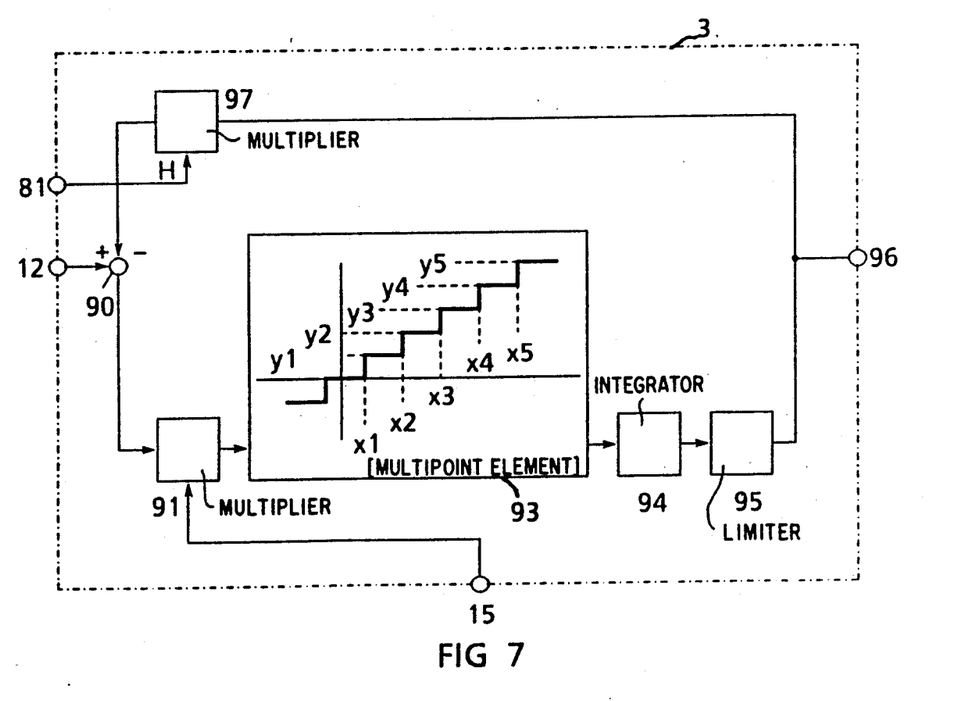
FIG. 7 is a controller constructed according to the present invention.

Referring to FIG. 7, a refinement of the controller 3 is shown. The setpoint deviation of the system voltage is fed to the input 12 of controller 3. The input 12 is coupled to a first comparator 90, whose output is coupled to a multiplier 91 with a control input. A series connection comprising a multipoint element 93, an integrator 94, and a limiter 95 is coupled on the load side to the output of the multiplier 91. This limiter 95 is coupled to the output 96 of the controller 3. The signal H is the controller drooping characteristic which is fed to a first input of a second multiplier 97. The output 96 of the controller is coupled to a second input of the second multiplier 97. The output of the second multiplier is coupled to the other input of the comparator 90. The control input of the multiplier 91 is influenced by the final controlling input 15. The actual value deviation supplied to the controller 3 via its input 12 is amplified in the amplifier 91 and transmitted to the input of the multipoint element 93. An amplitude grid is generated in this multipoint element 93, Where fixed ranges of values y1 to y5 of the output signal correspond to variable ranges of values of the input signal x1 to x5. If, for example, the input signal assumes a value between x1 and x2, then the value y1 is present at the output and supplied to the integrator 94. The integrator output likewise assumes the value y1. If the input signal of the integrator goes back to zero after a variation, then the output value of the integrator 94 is retained. The output value of the integrator 94 changes again only when values deviating from zero are applied to the input of the integrator 94. The integrator 94 is designed so that its output can assume discrete values which have a definite connection with the triggering of the compensating element 7. If the signal applied to the multipoint element 93 has a value $\geq x4$ and $<x5$, then the integrator 94 assumes the value y4 at its output in the same computational step, that is, in this, the value can jump from y1 to y4.

The multiplier 97, which is arranged in the feedback loop multiplies the present circuit state, in this case y4, by the factor H (drooping characteristic of the controller). The system deviation applied to the input 12 is reduced by the amount of the signal from the multiplier 97. In this manner, the controller is provided with stability-increasing performance characteristics.

In this refinement of the controller 3, which is a switching controller, it is advantageous that when there are large variations of the controlled variable at the input 12, the individual stages of the variations are not run through slowly at the output 96. Instead, the controller 3 jumps over several switching stages.

In the power-factor correction operation, $\Delta V$ can be determined using the following method.

Figure 9:
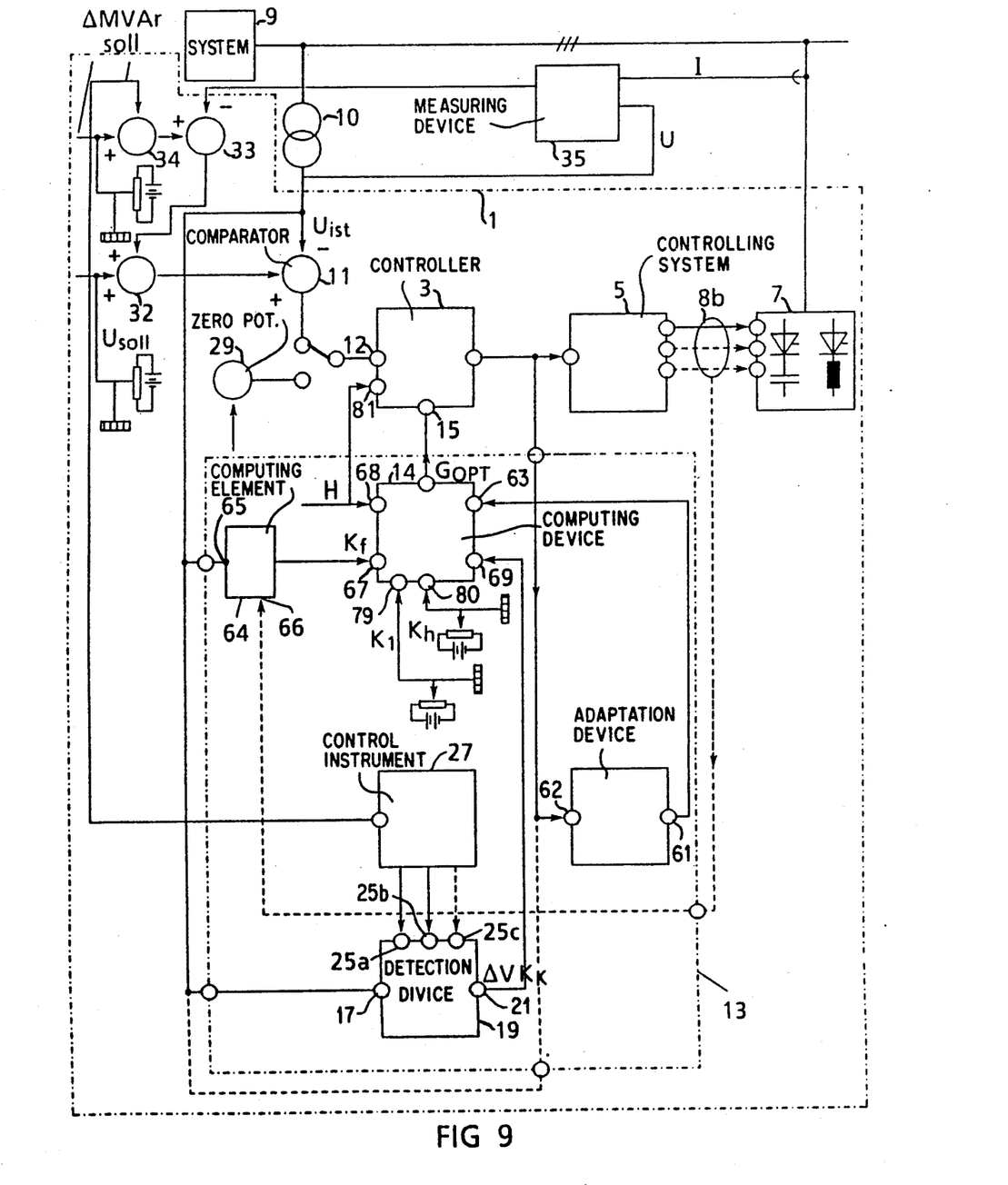
FIG. 9 is a block diagram of a device for adapting a controller in the power-factor correction operation constructed according to the present invention.

Referring to FIG. 9, a block diagram of a device for adapting a controller for power-factor correction operation is shown. Another comparator 32 is coupled as an input to the comparator 11. A voltage setpoint value $U_{Soll}$ is supplied to the first input of this comparator 32 and the second input is coupled to a third comparator 33. This third comparator 33 receives a reactive-power actual value at a first input via a measuring device 35. This measuring device 35 detects the reactive current I and the system voltage U at a system point. The second input of the comparator 33 receives a reactive-power setpoint value via an additional comparator 34. A reactive-power setpoint value $MVAr_{Soll}$ is supplied to the second input of this additional comparator 3a from the control instrument 27 at time t2.

At time t1, the control instrument 27 causes a first system voltage value to be measured in the device 19 via one of the trigger inputs 25a, 25b, 25c. The control instrument 27 stores this voltage value in a memory of the device 19. At a time between t1 and t2, the setpoint value $MVAr_{Soll}$ is measured and stored in a further memory of the device 19.

Next, the difference between the two system voltage values is formed in the device 19. This differential value is fed through the output 21 to the computing device 14. A parameter value of the controller 3 which determines the gain or hysteresis is calculated in the computing device 14 and entered in the final controlling input 15 of the controller 3. The most favorable setting for the controller 3 is determined by the deliberate changing of the circuit state of the compensating elements 7 to the system 9 and the resulting voltage change on the system 9. Preferably, these steps can also be repeated cyclically, so that a cyclical adaptation of the controller 3 takes place and so that changes in the system condition that have occurred in the interim are considered in the parameters of the controller 3.

After the measurement at time t2, the circuit state of the compensating element 7 can be restored to the original circuit state and, at time t3, the third resulting system voltage value can be detected by the device 19. Thus, the intended variation of the system condition is canceled again. Now, a third system voltage value is compared to the second system voltage value. A differential value is formed from the difference of the last two system voltage values, as well as from the difference from the first two system voltage values. This differential value is subjected to a plausibility control, as described above. The plausibility control and the subsequent averaging of the two differential values takes place in a computing device.

Figure 10:
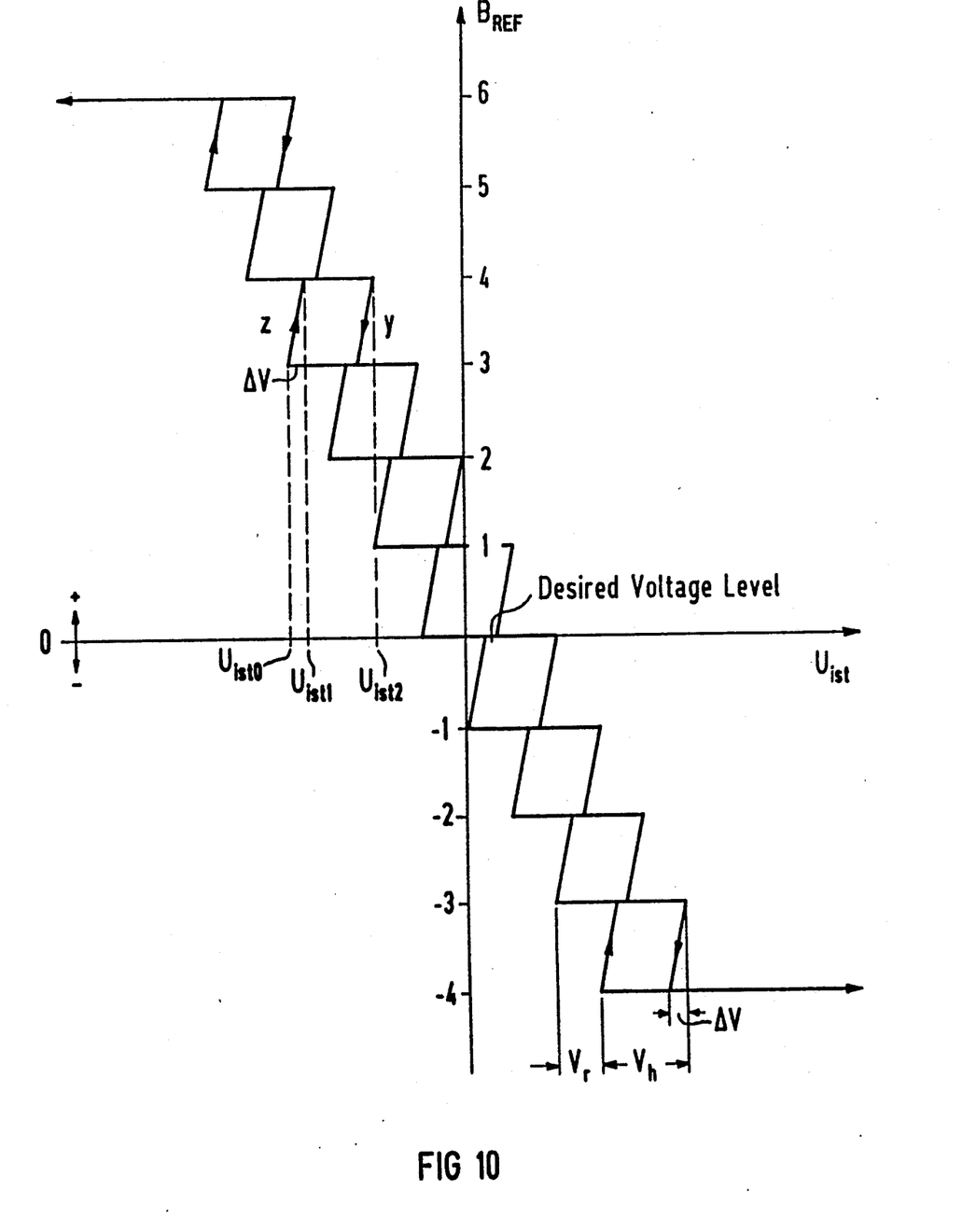
FIG. 10 shows the waveforms of the output characteristic of the controller of FIG. 1.

Referring to FIG. 10, the relation between the output $B_{REF}$ of the controller 3 and the actual value of the system voltage $U_{ist}$ is shown. Capacitive step signals $B_{REF}$ is positive) are plotted above the abscissa and inductive step signals ($B_{REF}$ is negative) are plotted below the abscissa. As one can recognize, discrete stages $B_{REF}$ for the connection or disconnection of elements of the compensating element are allocated to several ranges of values of the input signal $U_{ist}$. The voltage value $V_r$ per stage is proportional to the drooping characteristic H of the controller, thus $V_r = k \cdot H$. If, for example, the actual value of the system voltage has a value between $U_{ist1}$ and $U_{ist2}$, then a signal $B_{REF}$ corresponding to step 4 is applied to the output 96 of the controller 3. If, for example, the voltage climbs to a value that is greater than $U_{ist2}$, then the signal $B_{REF}$ is lowered in the direction of the arrow y from step 4 to step 3. The result is that a capacitive stage is switched out. If the voltage then falls below the value $U_{ist0}$, then the signal $B_{REF}$ is raised in the direction of the arrow z from step 3 to step 4. The action sequence in other steps proceeds analogously. The amount $U_{ist2} - U_{ist0}$ corresponds to the hysteresis value $V_h$, whereby $V_h = k_h \cdot \Delta V_{ist}$.

Figure 11:
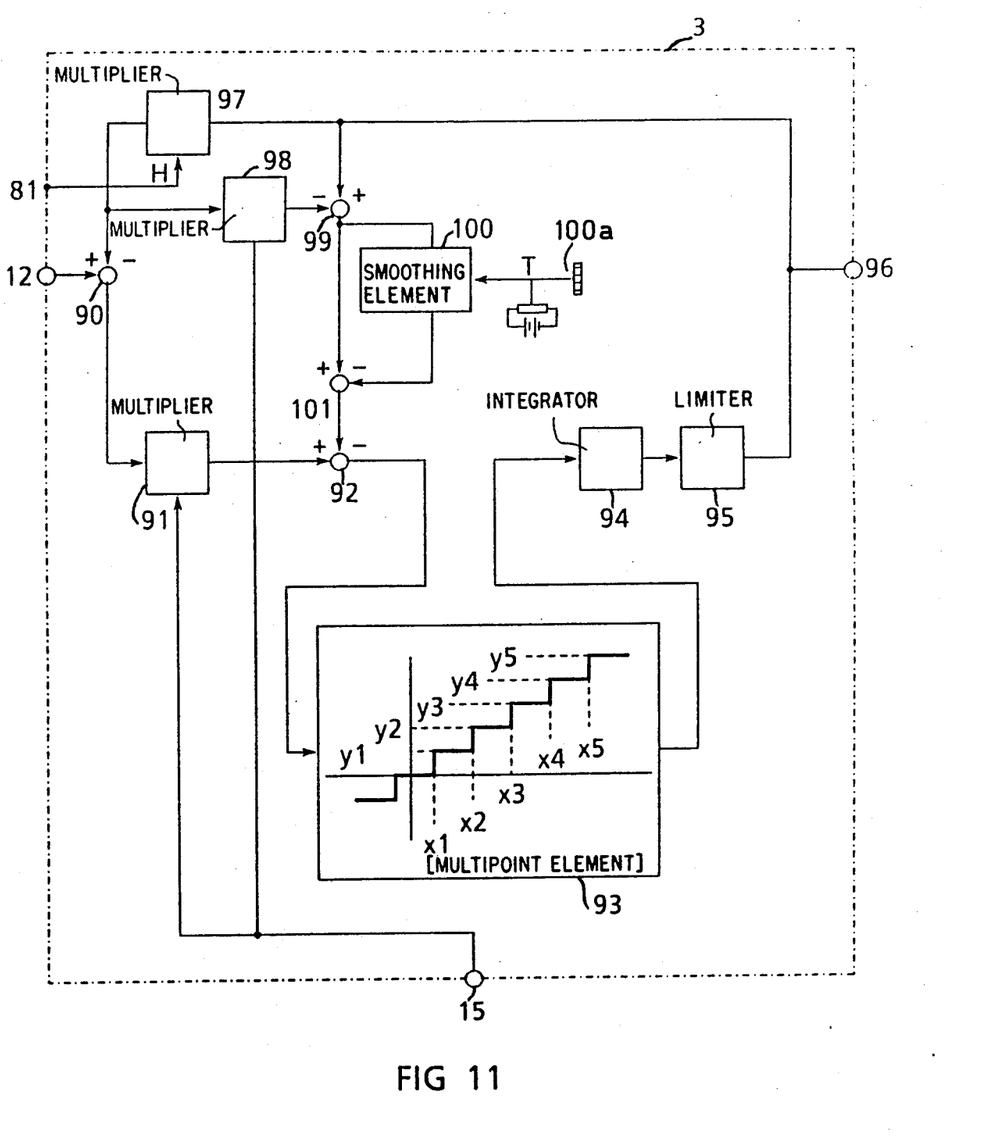
FIG. 11 is a detailed block diagram of the controller of FIG. 1.

Referring to FIG. 11, a refinement of the controller 3 is shown. The setpoint deviation of the system voltage is fed to the controller 3 via its input 12. The input 12 is coupled to a first input of a first comparator 90, whose output is coupled to a multiplier 91 with a control input.

A series connection comprising a second comparator 92, a multipoint element 93, an integrator 94 and a limiter 95 is coupled downstream to the output of the multiplier 91. The limiter 95 is coupled to the output 96 of the controller 3. The signal H (controller drooping characteristic) is fed to a first input of a multiplier 97. The output 96 leads back to a second input of the multiplier 97, whose output is coupled to the second input of the comparator 90. The control input of the multiplier 91 and 98 is influenced by the final controlling input 15. The third multiplier 98 acts through an input of a third comparator 99 on a smoothing element 100. The smoothing element 100 is connected via its second input to a potentiometer 100a to enter a signal proportional to an adjustable time t. The value $$\frac{1}{1+jwt}$$

is formed in the smoothing element 100 and is transmitted via its output to a first input of a fourth comparator 101. The output of the third comparator 99 also acts on the second input of the fourth comparator 101, whose output is coupled to the other input of the second comparator 92.

The actual value deviation supplied to the controller 3 via its input 12 is amplified in the amplifier 91 transmitted to the input of the multipoint element 93. An amplitude grid is generated in this multipoint element 93, where fixed ranges of values y1 to y5 of the output signal are allocated to variable ranges of values of the input signal x1 to x5. If, for example, the input signal assumes a value which is between x1 and x2, then the value y1 is present at the output which is supplied to the integrator 94. The integrator output likewise assumes the value y1. If the input signal of the integrator goes back to zero after a change, then the output value of the integrator 94 is retained. The value of the integrator 94 changes again only when values deviating from zero are applied to the input of the integrator 94. The integrator 94 is thus designed so that its output can assume discrete values which have a definite connection with the triggering of the compensating element 7. If the signal applied to the multipoint element 93 has a value $\geq x4$ and $<x5$, then the integrator 94 assumes the value y4 at its output in the same computational step, that is the value can jump from y1 to y4.

The multiplier 97 arranged in the feedback loop multiplies the current circuit state, for example y4, by the factor H (drooping characteristic of the controller). The system deviation applied to the input 12 is reduced by the amount of the signal from the multiplier 97. In this manner, the controller is provided with stability-increasing performance characteristics. Due to the elements 98, 99, 100 and 101 arranged in feedback paths, it is possible to feign a temporary reaction of the compensating element 7 and of the system 9 in the open loop of the controller 3. This effect can be adjusted to the entire system using the smoothing element 100, so that an especially fast automatic control is possible. Also, any possible overreaction by the controller 3 is suppressed. The output signal of the comparator 99 acts directly on the comparator 92, via the comparator 101 so that the controller deviation signal is reduced. The reduction is reset to zero by means of the smoothing element 100, in fact as a function of the specified time constant T. A sudden variation of the input signal results in an output signal which diminishes exponentially according to the relation $$\frac{1}{1+jwt}.$$

In this refinement of the controller 3 as a switching controller, it is advantageous that when there are large variations of the controlled variable at the input 12, the individual stages of the variation are not run through slowly at the output 96. Instead, the controller 3 jumps over several switching stages exhibiting a fast dynamic behavior.

What is claimed is:

1. A method for stabilizing an electric supply system by adapting a controller, in particular a controller of a static compensating device, where said controller has an output coupled to a controlling system, which causes compensating elements to be switched into the supply system comprising:
    a) forming a signal by means of a measuring transducer for a first system voltage value and storing said signal as information in a memory of a computer;
    b) modifying the circuit state of at least one compensating element, which has a defined value and is switchable to the system;
    c) forming a signal resulting from this modification for a second system voltage value by means of the detecting element and storing said signal as information in a further memory of a computer;
    d) calculating the difference between the signals for the first and the second system voltage values in said computer;
    e) calculating in said computer at least one parameter value of said controller defining the damping from the signal representing said difference and forming a proportional signal; and
    f) feeding said signal to a final controlling input of said controller.

2. The method of claim 1, and further including, after step c), the following steps:
    cc) returning the circuit state to the state prior to step b);
    cd) forming the signal resulting from step cc) as a third system voltage value by means of the detecting element and storing said value as information in a third memory of the computer; and
    in step d), forming the difference between the first and the second, as well as between the second and the third system voltage values in a computing device; subjecting said differential value to a plausibility control, calculating the average value of the two values in the computing device, and using said average value as the signal in step e) representing the difference.

3. The method of claim 2, further comprising: repeating said steps cyclically.

4. A method for stabilizing an electric output supply system by adapting a controller, in particular a controller of a static compensating device, where said controller has an output coupled to a controlling system, which causes compensating elements to be switched into the supply system comprising:
    a) forming a signal with a detecting element, which is coupled to a device carrying a signal which is dependent on the system voltage, and feeding said signal to a computer, monitoring said differential signal corresponding to the variation:

b) storing said differential signal as information in a memory;

c) forming a pulse signal when the differential signal is reset in said computer and storing said pulse signal as information in a further memory;

d) modifying at least one parameter value of the controller, said parameter determining damping in said controller when steps b) and c) have a positive result, said positive result being a criterion for an oscillation of the controller.

5. The method of claim 4, wherein the output signal of the controller coupled to the controlling system is monitored to form said signal that is dependent on the system voltage.

6. The method of claim 4, wherein an output signal of the controlling system between the controller and semiconductor switches of the compensating element is monitored to form said signal dependent on the system voltage.

7. The method of claim 4, wherein at least one of a voltage proportional to the system voltage and the system frequency is monitored to form said signal dependent on the system voltage.

8. The method of claim 7 and further comprising: decreasing said parameter that determines damping in said controller after said modification of the parameter for testing purposes.

9. A device for stabilizing an electric supply system, comprising a) a static compensating device coupled to said system, said device including:
   i) a controller having an input for a damping parameter and an output;
   ii) a controlling system having its input coupled to the output of said controller;
   iii) compensating elements; and
   iv) semiconductor switches controlled by said controlling system, which couple the compensating elements to the system;

b) a differentiating element having as an input a signal which is dependent on the system voltage;

c) two Schmitt triggers, one of which works in a positive direction and the other in a negative direction having the output of said differentiating element as inputs;

d) a series connection of a first timing element with OFF delay, an AND gate, a second timing element with OFF delay and a third timing element with ON delay coupled to the output of said first Schmitt trigger the output of the second Schmitt trigger coupled to the second input of said AND gate; and e) a computing device, said computing device having an output coupled to said input to said controller and having the output of the third timing element as an input.

10. The device of claim 9 and further including:

a) an OR gate arranged between the second and third timing element;

b) a series connection of a fourth timing element with OFF-delay, a second AND gate, and a fifth timing element with OFF-delay coupled to said second Schmitt trigger;

c) the output of said fifth timing element coupled to the second input of said OR gate; and d) the output of the first Schmitt trigger coupled to the second input of the second AND gate.

11. A device for stabilizing an electric supply system comprising:

a) a static compensating device coupled to said system, said device including:
   i) a controller having a damping parameter input and an output;
   ii) a controlling system having its input coupled to the output of said controller;
   iii) compensating elements; and
   iv) semiconductor switches controlled by said controlling system, which couple the compensating elements to the system;

b) a differentiating element having as an input a signal which is dependent on the system voltage;

c) two Schmitt triggers, one of which works in a positive direction and other in a negative direction having as inputs the output of said differentiating element;

d) a series connection of a first timing element, a first AND gate, a second timing element and a second AND gate coupled to the output of each Schmitt trigger;

e) the outputs of the respective Schmitt triggers additionally coupled to a second input of the second AND gate assigned respectively to said Schmitt triggers;

f) said series connection coupled to the second input of the first AND gate of the other Schmitt trigger;

g) an OR gate having as inputs the output signals of the two second AND gates; and h) a computer having as inputs the outputs of said OR gate, said computer having an output coupled to said controller input.

12. A device for stabilizing an electrical supply system comprising:

a) a static compensating device coupled to said system, said device including:
   i) a controller having a final controlling input and an output;
   ii) a controlling system having its input coupled to the output of said controller;
   iii) compensating elements; and
   iv) semiconductor switches controlled by said controlling system, which couple the compensating elements to the system;

b) a device coupled to the system for detecting the system voltage;

c) two storage units having as inputs the output of said device, each storage unit also having trigger inputs;

d) a control instrument, which at specified times t1 and t2 transmits triggering pulses to said storage units;

e) a comparator having the output signals of the storage units as inputs;

f) a computing device having as an input the output of said comparator, the output of said computing device coupled to said final controlling input of said controller, said input determining damping.

13. A device for stabilizing an electrical supply system comprising:

a) a static compensating device coupled to said system, said device including:
   i) a controller having a final controlling input and an output;

ii) a controlling system having its input coupled to the output of said controller;
iii) compensating elements; and
iv) semiconductor switches controlled by said controlling system, which couple the compensating elements to the system;

b) a device, coupled to the system, for detecting the system voltage;
c) three storage units having as inputs the output of said device for detecting said storage units also having trigger inputs;
d) a control instrument with three outputs which at specified times t1, t2 and t3 respectively transmit triggering pulses, said outputs coupled to respective trigger inputs of the storage units;
e) a first comparator having inputs to which the outputs of the first and second storage units are coupled;
f) a second comparator having inputs to which the outputs of the second and third storage units are coupled;
g) an element for accumulating the output of each comparator;
h) two additional storage units having as inputs the outputs of said elements for accumulating;
i) a first computing device having as inputs the outputs of said additional storage units;
j) a further computing device having as inputs the outputs of said first computing device; and
k) said further computing device having its output coupled to said final controlling input of the controller, said input determining damping.

14. A device for use in a static compensating device for stabilizing an electric supply system, comprising:
a static compensating device coupled to said system, said compensating device including:
a controller having a final controlling input and an output;
a controlling system having its input coupled to the output of said controller;
compensating elements; and
semiconductor switches controlled by said controlling system, which couple the compensating elements to the system;
a device coupled to the system for detecting the system voltage;
a computer coupled to said static compensating device to calculate a parameter value which determines damping for the device, said calculation being done according to the mathematical equation:

$$G_{OPT} = k_1 \frac{1}{\Delta V \cdot k_k \cdot k_h \cdot k_f + H}$$

where
$K_1$ = constants, dependent on the possible gain of the actual-value signal;
$\Delta V$ = a detected voltage deviation in the system, which occurs when a compensating element is actuated, or which results when changing by a definitely specified MVAr-value;
$k_k$ = correction constants, which are retrieved as a function of the respective switched stage by way of a programmable memory;
$k_h$ = constants, with which a hysteresis of the controller can be specified;
$k_f$ = a correction factor, which is a function of the respective system frequency;
H = drooping characteristic of the controller with which the slope of the characteristic curve of the controller can be specified.

15. A controller for use in a static compensating device for stabilizing an electrical supply system comprising:
an input, for accepting a setpoint deviation of the system voltage as a controlled variable, and an output;
a first comparator coupled to said input;
a first multiplier with a signal input and control input having the output of said comparator coupled to said signal input;
a series connection comprising a multipoint element, an integrator and a limiter coupled to the output of said first multiplier;
the output of said limiter coupled to the output of said controller;
a further multiplier having as a first input the output of said limiter;
said further multiplier having its output coupled to the second input of said first comparator; and
a signal H proportional to the droop characteristic of the controller coupled to a second input of said multiplier, the control input of said first multiplier serving as the final controlling input for the reference variable of the controller.

16. A controller for use in a static compensating device for stabilizing an electrical supply system comprising:
an input, for accepting a setpoint deviation of the system voltage as a controlled variable, and an output;
a first comparator to which said input is coupled;
a first multiplier having a first input coupled to the output of said first comparator and a control input;
a series connection comprising a comparator, a multipoint element, an integrator, and a limiter to which the output of said first multiplier is coupled;
the output of said limiter coupled to the output of said controller;
a further multiplier to which said output of said limiter is also coupled;
the output of said further multiplier coupled to the second input of said first comparator;
a third multiplier having a first input coupled to the output of said further multiplier and having a control input;
said further multiplier having a further input for receiving a signal proportional to the drooping characteristic of the controller;
a third comparator, to which the output of the third multiplier is coupled said third comparator having a second input coupled to the output of said limiter;
a smoothing element and a fourth comparator coupling the output of said third comparator to another input of said second comparator;
the output of said third comparator also coupled to an input of said fourth comparator; and
the control inputs of both multipliers coupled to each other and receiving an input serving as the final controlling input for the reference variable of the controller.

17. A method for stabilizing an electric output supply system by adapting a controller, in particular a controller of a static compensating device, where said controller has an output coupled to a controlling system, which causes compensating elements to be switched into the supply system comprising:

a) forming a signal with a detecting element, which is coupled to a device carrying a signal which is dependent on the system voltage, and feeding said signal to a computer, monitoring said differential signal corresponding to the variation:

b) storing said differential signal as information in a memory;

c) forming a pulse signal when the differential signal is reset in said computer and storing said pulse signal as information in a further memory;

(cc) detecting in said computer a renewed change of signals in the same direction as in step a) and storing said signals as information in a third memory;

(dd) modifying at least one parameter of said controller, said parameter determining hysteresis, when steps a), b), c), and cc) have a positive result, said result being a valid criterion for vibration of the controller.

* * * * *